(12) United States Patent
Onoue

(10) Patent No.: US 6,186,581 B1
(45) Date of Patent: Feb. 13, 2001

(54) END MEMBER FOR A HOLLOW STRUCTURAL PIECE ON A VEHICLE, AND METHOD OF USING SAME

(75) Inventor: Taku Onoue, Dublin, OH (US)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/131,621

(22) Filed: Aug. 10, 1998

(51) Int. Cl.$^7$ ...................................... B60J 10/04
(52) U.S. Cl. ......................... 296/187; 296/201; 296/205
(58) Field of Search ................................ 296/187, 201, 296/205, 209; 277/1; 138/89

(56) References Cited

U.S. PATENT DOCUMENTS

| | | | |
|---|---|---|---|
| 3,956,549 | * | 5/1976 | Stoeberl . |
| 3,964,339 | * | 6/1976 | Antonio et al. ...................... 74/551.9 |
| 4,898,630 | * | 2/1990 | Kitoh et al. . |
| 4,901,395 | * | 2/1990 | Semrau . |
| 5,040,803 | * | 8/1991 | Cieslik et al. . |
| 5,054,240 | | 10/1991 | Nakahara ............... 49/476 |
| 5,327,942 | * | 7/1994 | Black ..................... 138/89 |
| 5,499,737 | * | 3/1996 | Kraus .................... 220/307 |
| 5,678,826 | * | 10/1997 | Miller ..................... 277/1 |
| 5,805,919 | * | 9/1998 | Davies .................... 296/31 |
| 6,032,695 | * | 3/2000 | Wellen et al. ............. 138/89 |
| 6,058,977 | * | 3/2000 | Hotta ...................... 138/89 |

FOREIGN PATENT DOCUMENTS

| | | | | |
|---|---|---|---|---|
| 62-15118 | * | 1/1987 | (JP) | ...................................... 296/201 |
| 5-319305 | * | 12/1993 | (JP) | ...................................... 296/205 |

* cited by examiner

Primary Examiner—D. Glenn Dayoan
Assistant Examiner—Mickki D. Murray
(74) Attorney, Agent, or Firm—Carrier, Blackman & Associates, P.C.; William D. Blackman; Joseph P. Carrier

(57) ABSTRACT

An end member is disclosed which is installable on a structural portion of a vehicle body, to block an opening leading to a hollow passage inside of the structural portion, in order to reduce or eliminate wind noise from air moving through the hollow passage. The end member includes a blocking portion for blocking an opening in a vehicle body section, and an engaging portion for contacting an edge of the vehicle portion, the engaging portion being attached to the cover portion. Preferably, the cover portion and engaging portion are formed as a unit. The end member may include a plug body formed of a heat-resistant plastic, and an attached engaging portion formed of a second, thermally deformable plastic. A method of sealing a structural portion of a vehicle body includes a step of blocking an opening in a structural portion of a vehicle body, wherein the opening communicates with a hollow passage in the structural portion, with a plastic end member. The method hereof further includes a step of affixing the end member to the structural portion in such a way that a portion thereof is retained blocking the opening. The affixing step may include applying heat to the end member.

26 Claims, 4 Drawing Sheets

US 6,186,581 B1

END MEMBER FOR A HOLLOW STRUCTURAL PIECE ON A VEHICLE, AND METHOD OF USING SAME

BACKGROUND OF THE INVENTION

1. Field of the Invention

The present invention relates to vehicle bodies, and to accessory components therefor. More particularly, the present invention relates to an end member for installation blocking a hollow end of a structural portion of a vehicle, and to a method of using the end member to block a hollow end of such a structural portion. Even more particularly, the present invention relates to an end member for installation blocking an open end of a structural portion such as, for example, a door sash of a vehicle, to help reduce or eliminate wind and other noise therethrough when the vehicle is in motion, in which a portion of the end member is made of a thermally deformable plastic, and to a method of using the end member.

2. Description of the Background Art

Sometimes, structural parts of a vehicle, such as, for example, a vehicle pillar, or a door sash for surrounding and supporting a window panel in a car door assembly, may be made hollow, and further may have one or more end portions with exposed hollow openings therein. In some instances, such a hollow door sash may extend into the interior of a vehicle door, and may be welded on to the door with the open end thereof left unplugged. Under some circumstances, in a finished vehicle traveling on the highway, wind pressure may find a way into a vehicle door, and may also get into the hollow interior passage of the door sash. Wind flowing through the hollow interior passage may set up a resonance, leading to a whistling sound or to other unwanted wind noise.

Some plugs and caps are known for vehicle accessories.

Nakahara, U.S. Pat. No. 5,054,240 discloses an end member for sealing an open end of a piece of vehicle weatherstripping. The Nakahara reference discloses a number of different configurations for weatherstrip end members. In a first embodiment of the disclosure of Nakahara, an elastically deformable cap is provided for placing over and surrounding an end of a section of weatherstripping, and for attaching the weatherstripping to a vehicle body panel. In a second embodiment of the disclosure of Nakahara, a C-shaped clip is provided for partially inserting into a hollow end of a section of weatherstripping. The C-shaped clip includes an upper lip for gripping engagement above a metal drip channel on a vehicle body, and a lower lip for gripping engagement below a piece of weatherstripping, to clampingly fasten it to the drip channel.

A need still exists in the art for an end member suitable for blocking placement on an open end of a structural portion of a vehicle body, such as a pillar or door sash. In particular, an end member formed as a plug or cap, in which a first portion is formed of a first material which is a heat-resistant plastic, and a second portion is formed of a second material which is a thermally softenable and deformable plastic, would be advantageous in providing a way to block an open end of a vehicle body portion.

SUMMARY OF THE INVENTION

The present invention provides an end member which is installable on a vehicle body structural portion, to block an opening leading to a hollow passage inside of the portion.

An end member in accordance with the present invention, generally, includes a blocking body, having a blocking portion for blocking an opening in a vehicle body portion, and an engaging portion for contacting a side edge of the vehicle body portion, the engaging portion being attached to the blocking portion. Preferably, the blocking portion and the engaging portion are integrally formed as a unitary member. In the most preferred embodiment, the end member further includes a sealing member which is operatively attached to the blocking body for adhering the end member to the vehicle body portion.

The present invention also provides a method of blocking an opening in a structural portion of a vehicle body. A method in accordance with the present invention includes a step of placing an end member in blocking relation to an opening in a structural portion of a vehicle body, and a step of affixing the end member to the structural portion in such a way that a portion of the end member is retained blocking the opening.

Accordingly, it is an object of the present invention to provide an end member, and method of use thereof, for blocking an opening in a structural portion of a vehicle body, such as a pillar or sash member.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Figure 1:
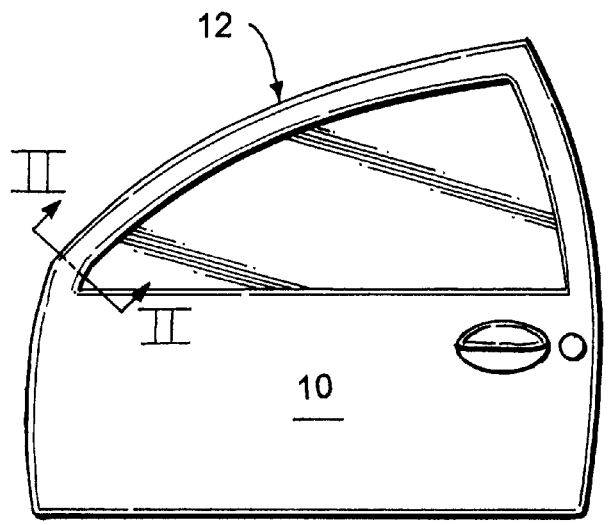
FIG. 1 is a side elevational view of a vehicle door assembly.

Referring now to FIG. 1, a vehicle door 10 is shown, having a door sash 12 with a hollow interior passage 14 (FIG. 2A) formed therein. As previously noted, under some circumstances, in a finished vehicle traveling on the highway, wind pressure may find a way into a vehicle door 10, and may also get into the hollow interior passage 14 of the door sash 12. Conceivably, wind flowing through the hollow interior passage 14 may set up a resonance, leading to a whistling sound or other unwanted wind noise.

In order to prevent such wind noise, the present invention provides an end member 16 for blocking an opening 18 in the end of the sash 12, where the opening 18 leads into, and is in fluid communication with the hollow interior passage 14 thereof.

Referring now to FIGS. 2A, 2B, and 3–6, in a first embodiment, the end member 16 takes the form of a plug 20 for blocking and interfering placement through the opening 18 and into an end portion of the hollow passage 14, to block and substantially seal off the opening 18.

The end member 16, in this embodiment, includes a plug body 22 for placement in and for blocking the opening 18 of the door sash 12. The plug body 22 is preferably formed from a relatively stiff and inflexible heat-resistant plastic such as nylon, a combination of PPO and 6 nylon, or other suitable materials. The plug body 22 includes a blocking portion 24 which is a first plate 26. The plug body 22 further includes a second plate 28 which is connected to the first plate by a narrow midsection 30. The plug body 22 also includes a reduced diameter portion 32 attached to the second plate for placement inside the hollow passage 14, and for receiving an optional sealing member 34 thereon. The reduced diameter portion 32 is provided with tapered ramps 36, 38, 40, 42 (FIG. 6) on opposite sides 44, 46 thereof to allow pressed-on placement of the sealing member 34 therepast, but the ramps have flat inner surfaces which are substantially transverse to the sides 44, 46 of the plug body 22 so as to retain the sealing member thereon, after it is pushed past the ramps.

The plug body 22 is constructed, arranged, and dimensioned so as to fit inside the hollow passage 14 and to closely conform to the shape thereof. As a result, the shape of the plug body 22 will often be irregular and configured to match the shape of the hollow passage 14. The sides 44, 46 of the plug body 22 also have outwardly protruding integral ribs 50, 52, 54, 56, respectively, thereon for interferingly contacting opposed inner side surfaces 58, 60 of the sash 12 when force fitted or forcibly inserted therein. These ribs 50, 52, 54, 56 serve as engaging portions of the end member 16.

Figure 2B:
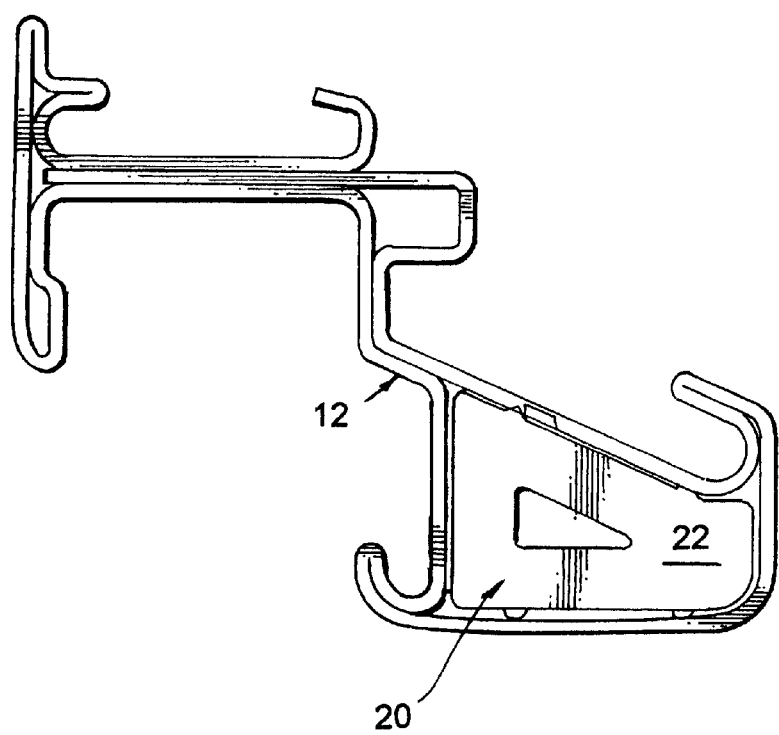
FIG. 2B is an end plan view of the door sash and end member of FIG. 2A, shown in an assembled configuration thereof.
Figure 2A:
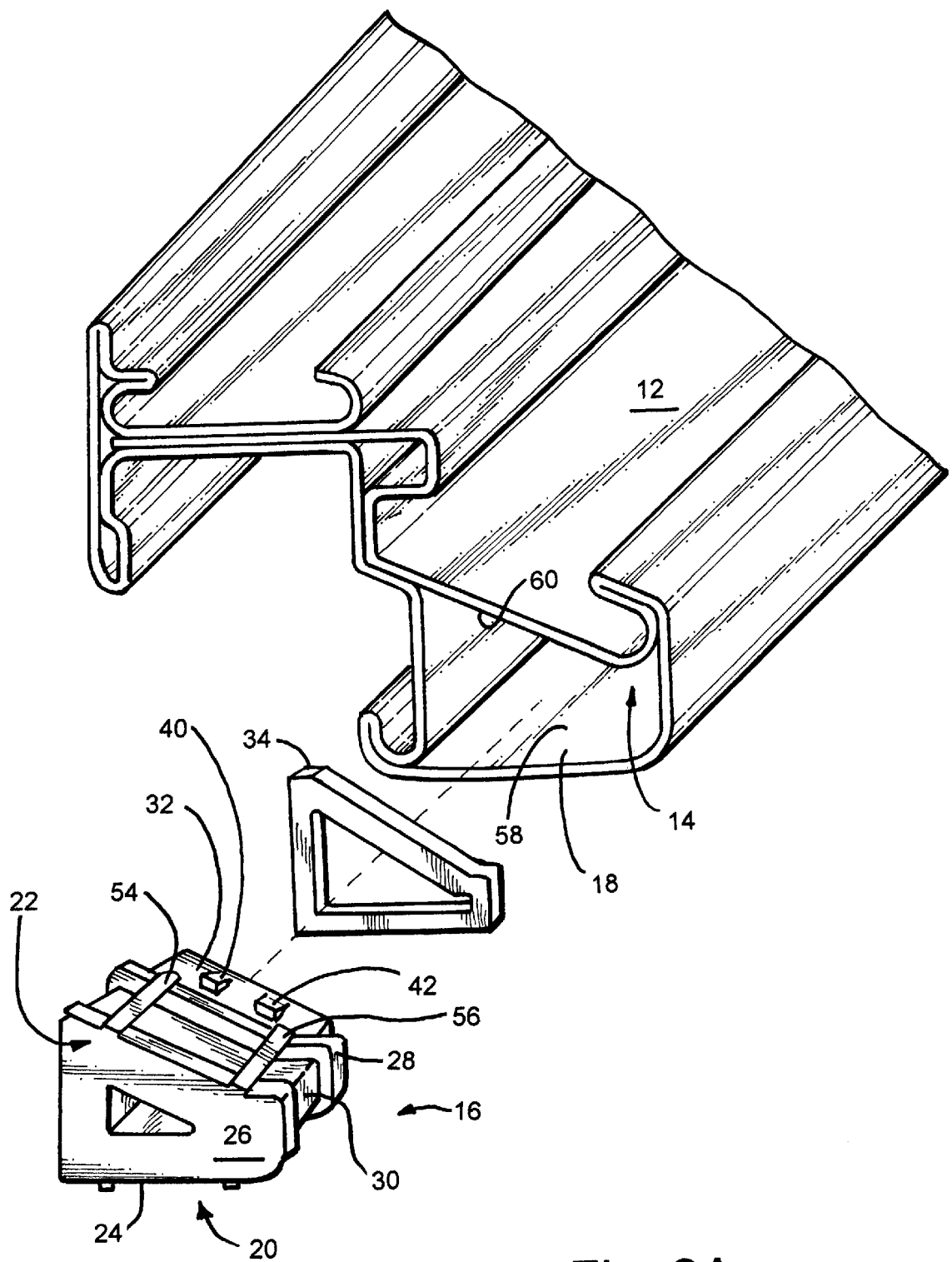
FIG. 2A is an exploded perspective view, partially cut away, of a portion of a door sash and an end member in accordance with a first embodiment of the present invention, taken along the line 2—2 of FIG. 1.
Figure 5:
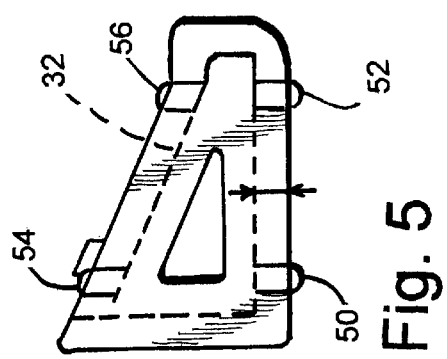
FIG. 5 is a top plan view of the end member of FIGS. 3–4.
Figure 6:
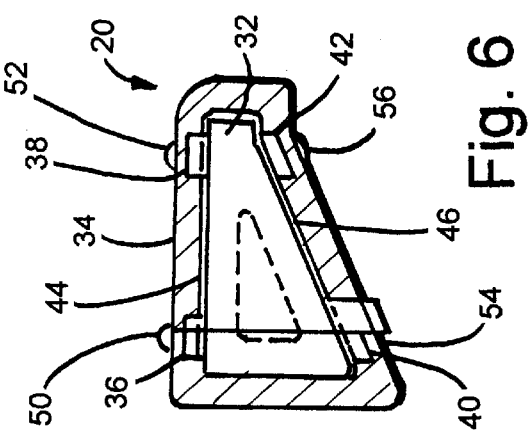
FIG. 6 is a bottom plan view of the end member of FIGS. 3–5.
Figure 4:
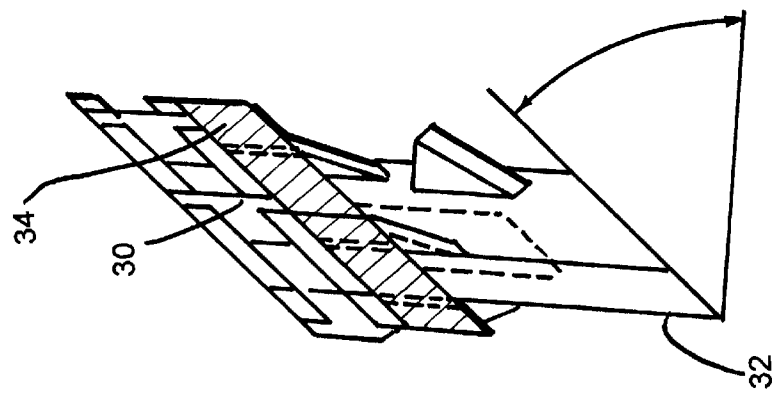
FIG. 4 is an end elevational view of the end member of FIG. 3.
Figure 3:
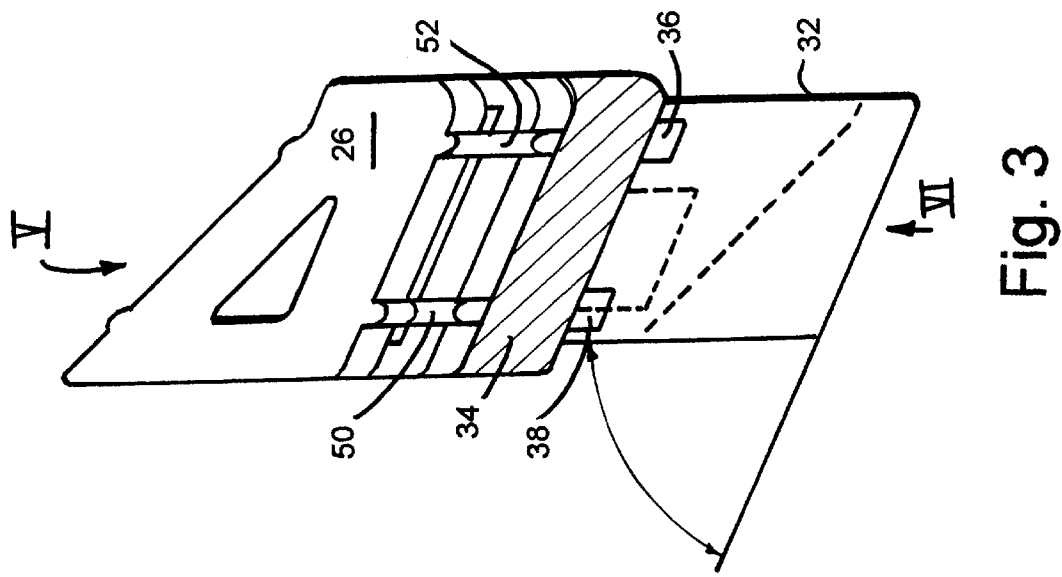
FIG. 3 is a side elevational view of the end member depicted in FIG. 2A.

The sealing member 34, as shown in FIGS. 2A and 6, is in the form of a peripheral band or ring shaped to surround and conform to the shape of the reduced diameter section 32 of the plug body 22. The sealing member 34, where used, is preferably formed of a different material from the plug body 24, and most preferably, is formed from a thermally deformable plastic or thermoplastic material such as ethylene vinyl acetate. Other possible materials which may be used for the sealing member include polyethylene, polypropylene, polychloroprene, and mixtures of these plastics with each other and with EVA. When exposed to heat at a level which may be found in paint ovens the sealing member 34 will melt and adhere the plug body 22 to the inside walls 58, 60 of the sash 12 or other vehicle body portion. In most uses thereof, the sealing member 34, when melted, will also form a substantially air tight seal between the plug body 22 and the sash 12. In this way, the sealing member 34 also acts as an adhesive member for the end member 16.

Figure 7:
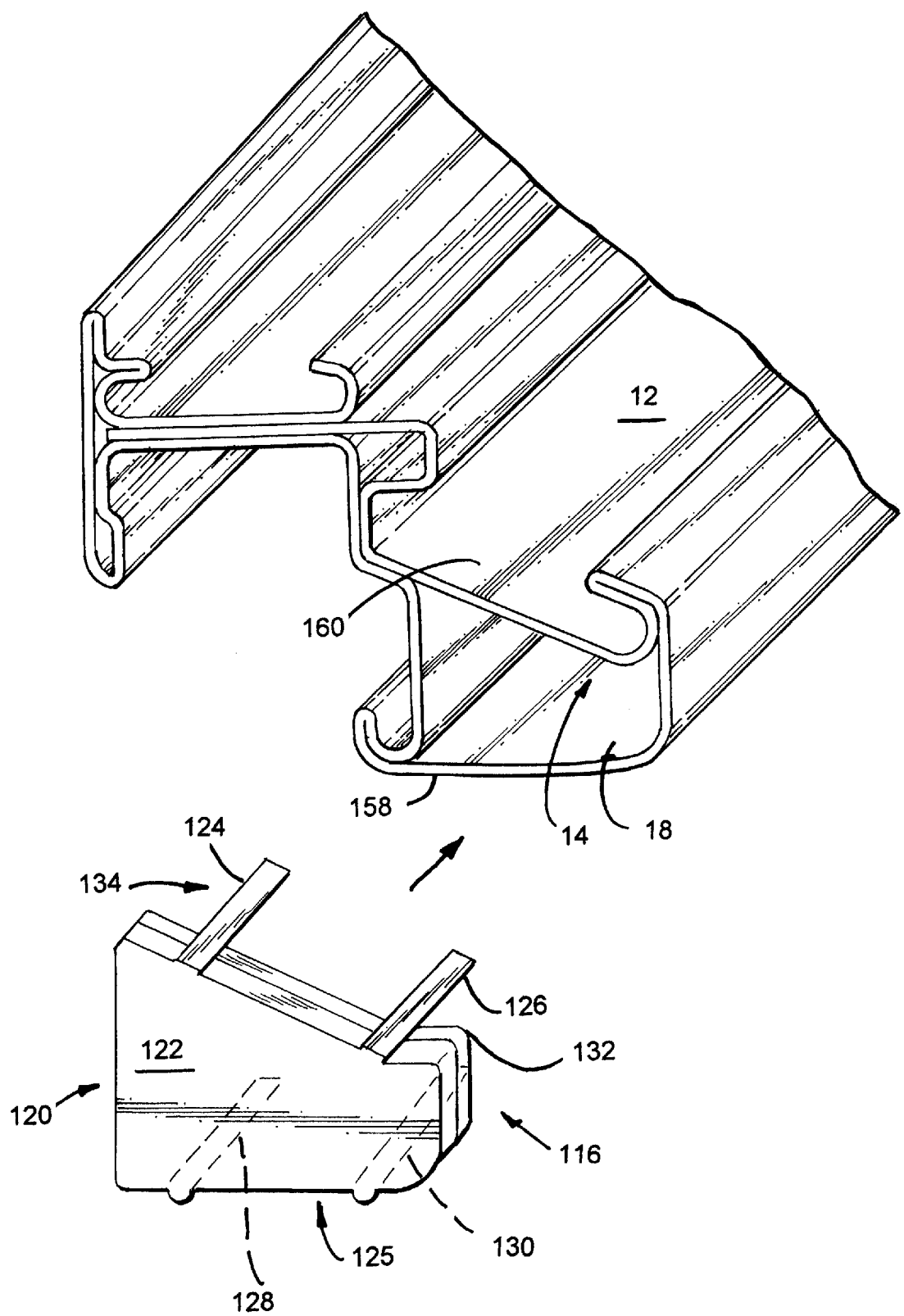
FIG. 7 is an exploded perspective view, partially cut away, of a portion of a door sash and an end member in accordance with a second embodiment of the present invention.

Referring now to FIG. 7, a second embodiment of an end member 116 is shown for blocking the opening 18 in the sash 12. This end member 116 takes the form of a cap 120. The cap 120 includes a cap body 125 having a cover plate 122 for covering the opening 18 in the sash 12. The cover plate 122 serves as a blocking portion of the cap 120. The cap body 125 further includes a plurality of arms 124, 126, 128, 130 for contacting outer side edges 158, 160 of the sash 12. The arms 124, 126, 128, 130 provide engaging portions 134 of the cap 120. Alternative equivalents (not shown) to the arms 124, 126, 128, 130 could include arms or other extensions which extend into the hollow interior 14 of the sash 12, or a continuous edging which surrounds the outer surface of the sash end and which is connected to the cover plate 122. In the preferred embodiment of the cap 120, a backing layer 132 is provided behind the cover plate 122, and where used, this backing layer 132 is formed of a different material than the cover plate 122, and is made of a thermally deformable plastic such as ethylene vinyl acetate. The backing layer 132 is able to function as a sealing member.

Method of Use

The present invention also encompasses a method of blocking an opening 18 formed in an a structural portion of a vehicle, such as the sash 12 shown in the drawings.

A method in accordance with the present invention includes a step of placing or forcibly inserting an end member such as 16 or 116 in blocking relation to the opening 18 in the structural portion 12. The method further includes a step of affixing the end member 16 or 116 to the structural portion 12, in such a way that a portion 26 or 122 thereof is retained blocking the opening 18. The affixing step may be accomplished by baking the structural portion 12 in an oven such as, for example, a paint oven.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

I claim:

1. An end member for installation on an end of a hollow structural portion of a vehicle body, said end member comprising:
   a blocking body formed from a heat-resistant plastic, said blocking body comprising:
      a blocking portion for blocking an opening in an end of a hollow structural portion of a vehicle, and
      an engaging portion attached to said blocking portion for contacting an edge of the vehicle structural portion; and
   a sealing member operatively connected to said blocking body, said sealing member being formed from a thermoplastic material and being operable to adhere said end member in place in the opening.

2. The end member of claim 1, wherein said blocking body is formed from a material selected from the group consisting of PPO, 6-nylon, and mixtures thereof; and wherein said sealing member is formed from ethylene vinyl acetate.

3. The end member of claim 1, wherein said blocking body is in the form of a plug adapted to be forcibly inserted in the opening of the structural portion for interfering placement in the opening.

4. The end member of claim 3, wherein said engaging portion comprises integral ribs protruding outwardly from sides of said plug for interferingly contacting inner side surfaces of the structural portion.

5. The end member of claim 4, wherein said plug comprises a reduced diameter portion, and further wherein said sealing member comprises a thermally deformable thermoplastic operatively attached to said reduced diameter portion of said plug.

6. The end member of claim 5, wherein said sealing member comprises ethylene vinyl acetate.

7. The end member of claim 1, wherein said sealing member comprises ethylene vinyl acetate.

8. The end member of claim 1, wherein said end member is in the form of a cap for covering placement over an end of a vehicle body portion.

9. The end member of claim 8, wherein said cap comprises a backing layer of a thermally deformable plastic.

10. A method of blocking an opening formed in an end of a structural portion of a vehicle, comprising the steps of:

forcefitting an end member into blocking relation in said opening in said structural portion; and affixing said end member to the structural portion in such a way that the end member is retained blocking the opening;

wherein said affixing step comprises applying heat to melt a portion of said end member.

11. The method of claim 10, wherein said end member comprises a sealing member which comprises ethylene vinyl acetate and which adheres said end member to said structural portion when exposed to heat.

12. The method of claim 10, wherein said end member is in the form of a plug, and wherein said force fitting step is accomplished by forcing said plug into said opening.

13. The method of claim 10, wherein said end member is in the form of a cap which is placed over said opening in said placing step.

14. An end member for installing on an end of a hollow structural portion of a vehicle body, said end member comprising:

a plug body adapted to be force fitted for interfering placement in an opening in a hollow structural portion of a vehicle body, said plug body formed from heat-resistant plastic and having a reduced diameter portion; and a sealing member attached to said plug body for contacting an inner side edge of the vehicle body portion, wherein said sealing member comprises a thermally deformable thermoplastic which is operatively connected to said reduced diameter portion and adapted to melt and form a seal when heated.

15. The end member of claim 14, wherein said thermally deformable thermoplastic comprises ethylene vinyl acetate.

16. The end member of claim 14, wherein said sealing member is in the form of a periperal band surrounding said reduced diameter portion.

17. An end member for installation on an end of a hollow structural portion of a vehicle body, said end member comprising:

a blocking body which comprises a blocking portion for blocking an opening in an end of a hollow structural portion of a vehicle, and an engaging portion attached to said blocking portion for contacting an edge of the vehicle structural portion;

wherein said blocking body has an outer periphery sized and shaped similar to an inner periphery of the end of the hollow structural portion, and is adapted to be force fitted into the end of the structural portion to fully block the end; and a sealing member operatively connected to said blocking body, said sealing member being operable to adhere the said end member in place in the opening.

18. The end member of claim 1, wherein when the end member is heated, said blocking body is adapted to retain its shape, as force fitted in the hollow structural portion, and said sealing member is adapted to melt and form a seal between surfaces of the blocking body and the structural portion.

19. An end member for installation on an end of a hollow structural portion of a vehicle body, said end member comprising:

a blocking body which comprises a blocking portion for blocking an opening in an end of a hollow structural portion of a vehicle, and an engaging portion attached to said blocking portion for contacting an edge of the vehicle structural portion; and a sealing member operatively connected to said blocking body, said sealing member being disposed around a portion of the blocking body and operable to adhere said end member in place in the opening.

20. The method of claim 10, wherein the end member comprises a plug body and a sealing member disposed around a portion of the plug body, said sealing member is adapted to melt and adhere the plug body to the structural portion when heated.

21. The end member of claim 14, wherein when the end member is heated, said plug body is adapted to retain its shape, as force fitted in the hollow structural portion, and said sealing member is adapted to melt and form a seal between surfaces of the plug body and the structural portion.

22. The end member of claim 1, wherein said blocking body and said sealing member are formed of non-foaming plastics.

23. The end member of claim 14, wherein said plug body and said sealing member are formed of non-foaming plastics.

24. The method of claim 10, wherein said end member is formed of non-foaming plastics.

25. The end member of claim 1, wherein the seal member forms a substantially air-tight seal between the blocking body and the hollow structural portion when melted.

26. The end member of claim 15, wherein the reduced diameter portion includes means for securing the peripheral band thereon.

* * * * *

UNITED STATES PATENT AND TRADEMARK OFFICE
CERTIFICATE OF CORRECTION

PATENT NO.   : 6,186,581 B1
DATED        : February 13, 2001
INVENTOR(S)  : Taku Onoue It is certified that error appears in the above-identified patent and that said Letters Patent is hereby corrected as shown below:

<u>Title page,</u>
Under "[56] References Cited", and further under "U.S. PATENT DOCUMENTS", change the date for U.S. Patent 6,058,977 from "3/2000" to -- 5/2000 --.

<u>Column 3,</u>
Line 40, change "24" to -- 22 --.

<u>Column 4,</u>
Line 9, change "in an a" to -- in a --.

Signed and Sealed this

Twenty-third Day of October, 2001

*Attest:*

*Nicholas P. Godici*

NICHOLAS P. GODICI
*Attesting Officer*      *Acting Director of the United States Patent and Trademark Office*